United States Patent [19]
Smith

[11] Patent Number: 6,047,337
[45] Date of Patent: Apr. 4, 2000

[54] PARASITIC PERSONAL COMPUTER INTERFACE

[75] Inventor: Wesley H. Smith, Raleigh, N.C.

[73] Assignee: Cirrus Logic, Inc., Fremont, Calif.

[21] Appl. No.: 08/876,776

[22] Filed: Jun. 16, 1997

Related U.S. Application Data

[63] Continuation of application No. 08/513,095, Aug. 9, 1995, abandoned.

[51] Int. Cl.$^7$ .............................. G06F 9/30; G06F 13/16
[52] U.S. Cl. ................................ 710/23; 710/5; 710/129; 712/35
[58] Field of Search .................... 395/800.34, 800.35, 395/200.46, 200.42, 200.43, 842, 847, 825, 892, 500, 309, 311, 200.38, 200.41, 843; 711/147, 150, 153; 712/35

[56] References Cited

U.S. PATENT DOCUMENTS

| | | | |
|---|---|---|---|
| 4,296,466 | 10/1981 | Guyer et al. ............................. | 364/200 |
| 4,438,488 | 3/1984 | Shibayama et al. ............... | 395/200.42 |
| 4,807,121 | 2/1989 | Halford ................................... | 364/200 |
| 4,901,232 | 2/1990 | Harrington et al. .................... | 364/200 |
| 4,939,644 | 7/1990 | Harrington et al. .................... | 364/200 |
| 5,170,470 | 12/1992 | Pindar et al. ........................... | 395/275 |
| 5,179,689 | 1/1993 | Leach et al. ............................ | 395/425 |
| 5,193,204 | 3/1993 | Qureshi et al. ......................... | 395/800 |
| 5,388,841 | 2/1995 | San et al. ................................ | 273/435 |
| 5,513,368 | 4/1996 | Garia, Jr. et al. ....................... | 395/842 |

OTHER PUBLICATIONS

Creanza et al. "An ASIC Controller for the TMS 320, 2nd Generation Digital Signal Processor", EURO ASIC' 90, pp. 197–200: Online CD. IEEE/IEE Publication OnDisc, 1990.

*Primary Examiner*—Dung C. Dinh
*Attorney, Agent, or Firm*—Robert P. Sabath; Stanley N. Protigal; Peter Rutkowski

[57] ABSTRACT

A method and apparatus for coupling an External Device to a Host Computer, such that program code to be executed by the external device may be stored in the Host Computer memory and yet be essentially independent of the Host Computer. Hardware and software enable the logical displacement of a program and address bus across interprocessor interfaces. An External Device preferably provides direct access to program code stored within Host Computer memory by means of a conventional DMA function. Program code which is to be executed by the External Processor within the External Device is transferred from the Host Memory to an Instruction Buffer memory within the External Device. The External Processor determines when to request additional instructions from the Host Memory over the DMA channel on a timed interrupt basis. The External Processor requires an instruction that is not present in the buffer, then the buffer returns an instruction to the External Processor that causes the External Processor to request additional instructions from the Host Memory which include the required instruction. A multiplexer is provided which allows instructions to be provided to the External Processor from a special purpose program memory in which instructions for special purpose functions are stored. Functions within the program code stored within the Host Memory (i.e., "CP" functions) are preferably not time critical functions. Accordingly, the program code that is stored in the Host Memory and which is to be executed by a processor within the External Device is referred to as a "CP Function Program Code". Time critical functions to be performed by the processors of the External Device are preferably not performed by the CP Function Program Code, but rather are performed by executing program code that is stored locally (i.e.,"External Program Code).

2 Claims, 6 Drawing Sheets

PARASITIC PERSONAL COMPUTER INTERFACE

This application is a continuation of application Ser. No. 08/513,095, filed Aug. 9, 1995, now abandoned.

BACKGROUND OF THE INVENTION

1. Field of the Invention

This invention relates to computer interfaces and resource sharing, and more particularly to a method and apparatus storing within a memory resident within a computer system a program to be executed by a remote processor.

2. Description of Related Art

It is common today for a general purpose local processor to be assisted by a number of other more specialized processing devices. For example, even relatively small computers (such as personal computers) have a general purpose local "host" processor that performs a majority of the processing related to applications to be performed by the computer. For example, the host processor reads the instructions which are part of an application, such as a word processing program, and determines which of the processors are to perform the function. Such host processors are typically assisted by at least a video processor, a digital signal processor, an I/O control processor, a math coprocessor, and other such processing devices.

In some instances, such as in the case of laptop computers, some of the processing is performed by remote devices coupled to the laptop computer through external ports, such as the well-known PCMCIA port available on many modern laptop computers. These external ports allow the laptop computer to be versatile, lightweight, and inexpensive. One example of a peripheral device which may be coupled to a PCMCIA port is a modem. Modems are well-known devices that allow information to be transmitted and received over telephone lines. Accordingly, by coupling a modem to the PCMCIA port of a laptop computer, the laptop computer may transmit and receive information to and from any other device that is similarly connected to the other end of the telephone line.

FIG. 1 is a block diagram of a system in accordance with one method for coupling an External Processing Device 104 to a Host Computer 100. The External Processing Device 104 is packaged together with a data buffer 118, a I/O buffer 108, a program memory 110, and a data memory 112. The External Processing Device 104 within the external device 102 receives commands from the Host Computer 100 through an I/O bus 106 coupled between the Host Computer 102 and an I/O buffer 108. The External Processing Device 104 reads the commands from the I/O buffer 108 and executes programs from the program memory 110. When a command is received, the External Processing Device 104 sets a program counter (PC) 120 starting address. The starting address indicates which program instruction is to be fetched from the program memory 110 to be executed by the External Processing Device 104.

Data can be obtained by the External Processing Device 104 either directly from a data memory 112 within the external device 102 or from a host data memory 114 within the Host Computer 100. For example, if the external device performs video compression, then uncompressed video data may be read from the host data memory 114 and compressed video data stored back in the host data memory 114. Later, the compressed video data is read from the host data memory 114 and decompressed. When data is to be read from the host data memory 114, a direct memory access (DMA) operation is performed. Such DMA operations are well known in the art. Typically, a request is made for data to be read or written to the memory together with a start address and block size. The data is then read (or written) from (or to) the host data memory 114 under the control of a DMA device 116 which writes (or reads) the data to (or from) a DMA buffer memory 118. DMA operations allow the data to be transferred without the involvement of the host processor 122 or the External Processing Device 104. One of the problems with this architecture is that in some circumstances, such as in modem, voice recognition, audio processing, and video processing applications, the amount of work that the external processor 104 must do is greater than the processing resources available.

In such cases, as shown in FIG. 2, some external devices, such as modems, include a Control Processor (CP) 201 which off loads some of the overhead functions which need to be performed in the external processor 204, which, for example, in a modem is typically a digital signal processor (DSP). Commands sent from the Host Computer 100 over the I/O bus 106 are buffered in the command buffer memory 208. The CP 201 decodes those commands from the Host Computer 100 and provides commands and control functions to the DSP 204. Accordingly, the CP 201 performs functions which do not require the special arithmetic capabilities of the DSP 204. Thus the CP 201 off loads from the DSP 204 interface tasks, overhead tasks, and other functions for which the DSP 204 is not particularly designed and suited in order to allow the DSP 204 more processing resources to use in performing specialized arithmetic functions needed in modulation and demodulation tasks, such as calculating Fourier transforms.

However, in the architecture shown in FIG. 2, due to the size of the CP 201 and the complexity of the CP function performed by the CP 201, in addition to memories 212, 210 required to store DSP programs and data, relatively large and expensive memory devices 211, 213 are required to hold the CP function program instructions and CP data. In order to reduce the cost and size of modems, some modem manufacturers have implemented a "host based" system. Host based systems move the CP function from a modem 202 into the Host Computer 100. FIG. 3 is a block diagram of a modem 302 and Host Computer 300 configured as a host based modem system. As shown, the program instructions for the CP function (i.e., the "CP Function Program" code 304) reside in the Host Memory 306. A central processing unit (CPU) 308 within the Host Computer 300 executes the PC function program 304. Accordingly, the external device 302 is smaller and less expensive without a substantial increase in the size or burden placed on the Host Computer 300. However, the CP function must be written in a program language that can be executed by the Host Computer 300. Furthermore, the CPU 308 must execute the CP function in accordance with rules set by the Host Computer operating system. Accordingly, some additional burdens are encountered in host based systems. For example, the fact that the CP Function Program Code must be compatible with the Host Computer's operating system means that a different CP Function Program Code must be written for each type of operating system with which the external device is intended to be used. More specifically, if the manufacturer of a modem wishes to sell the modem for use with a Windows-based system, then Windows based CP Function Program Code must be written. If the manufacturer also wishes to sell the modem for use with DOS-based systems, a separate CP Function Program Code must be written for the DOS operating system. Since there are several operating systems used in Host Computers today, and these operating systems are occasionally upgraded to operating systems which are either not downwardly compatible, or which cause consumer demand for programs designed specifically for the new version of the operating system, the amount of development time required to write and debug the CP Function Program Codes is burdensome.

Accordingly, it would be desirable to provide a method and apparatus for coupling an External Processing Device to a Host Computer in such a way that the external device need not include a large, expensive memory, and yet such that only one CP Function Program Code need be written to accommodate all the possible Host Computers with which the external device may be used. The present invention provides such a method and apparatus.

SUMMARY OF THE INVENTION

The present invention is a method and apparatus for coupling an External Device to a Host Computer, such that program code to be executed by the external device may be stored in the Host Computer memory and yet be essentially independent of the Host Computer.

In accordance with the present invention, hardware and software enable the logical displacement of a program and address bus across inter-processor interfaces. An External Device preferably provides direct access to program code stored within Host Computer memory by means of a conventional DMA function. Program code which is to be executed by the External Processor within the External Device is transferred from the Host Memory to an Instruction Buffer memory within the External Device. In one embodiment of the present invention, the External Processor determines when to request additional instructions from the Host Memory over the DMA channel on a timed interrupt basis. The interrupt causes the External Processor to request transfer of additional instructions from the Host Memory to the Instruction Buffer memory within the External Device. In an alternative embodiment of the present invention, each time the External Processor is interrupted, the External Processor checks how many instructions remain within the Instruction Buffer. If there is an insufficient number of instructions within the Instruction Buffer, then the External Processor requests transfer of additional instructions from the Host Memory.

In another embodiment of the present invention, the Instruction Buffer is configured as an instruction cache. That is, instructions that are frequently used remain in the cache. When an instruction is required which is not present in the cache, the External Processor commands the DMA device to transfer a block of instructions including the required instruction from the Host Memory. The block includes other instructions that are likely to be needed, as determined by the probability that the other instructions will be executed within a short time after the required instruction has been executed.

In yet another embodiment of the present invention, "fetch" instructions within the program code itself instruct the External Processor to request additional instructions. These fetch instructions may be strategically placed within the code at points which are selected by the programmer of the program code to be prime points at which to request additional instructions in order to ensure that the Instruction Buffer always contains the next instruction to be executed by the External Processor.

Preferably, in each of the embodiments of the present invention, the External Processor requires an instruction that is not present in the buffer, then the buffer returns an instruction to the External Processor that causes the External Processor to request additional instructions from the Host Memory which include the required instruction. In one embodiment, the External Processor would then remain idle while the DMA device transferred the requested instructions from the Host Memory.

In the preferred embodiment of the present invention, a multiplexer is provided which allows instructions to be provided to the External Processor from a special purpose program memory in which instructions for special purpose functions are stored. For example, in a modem in which the External Processor is a digital signal processor (DSP), the special purpose functions include instructions for performing arthimetic operations for modulating and demodulating the signals at the physical layer (the signals which are transmitted on the telephone lines). Typically, such special purpose instruction are highly repetitive. Accordingly, the special purpose instructions do not require a large memory.

In another embodiment of the present invention, a control processor (CP) is present in the External Processor. The CP performs CP functions by executing the program code received from the Host Memory. Accordingly, the CP is responsible for requesting additional instructions to be transferred from the Host Memory to the Instruction Buffer. The External Processor is preferably coupled to the CP. The External Processor preferably receives commands from the CP and executes only the instructions stored in the special purpose memory.

In each of the embodiments of the present invention, functions (or tasks) that are included within the program code stored within the Host Memory (i.e., "CP" functions) are preferably not time critical functions. Accordingly, the program code that is stored in the Host Memory and which is to be executed by a processor within the External Device is referred to as a "CP Function Program Code". Time critical functions to be performed by the processors of the External Device are preferably not performed by the CP Function Program Code, but rather are performed by executing program code that is stored locally (i.e.,"External Program Code). If it would be detrimental to the operation of the External Device if the function were not performed within a specified amount of time, then in the preferred embodiment of the present invention, that function would not be included in the CP Function Program Code. Rather, such functions are included within the External Program Code stored locally within the External Device in a relatively small local External Processor memory in a manner that would allow them to be readily accessed by the External Processor on demand without the potential for delay.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Overview

Figure 1:
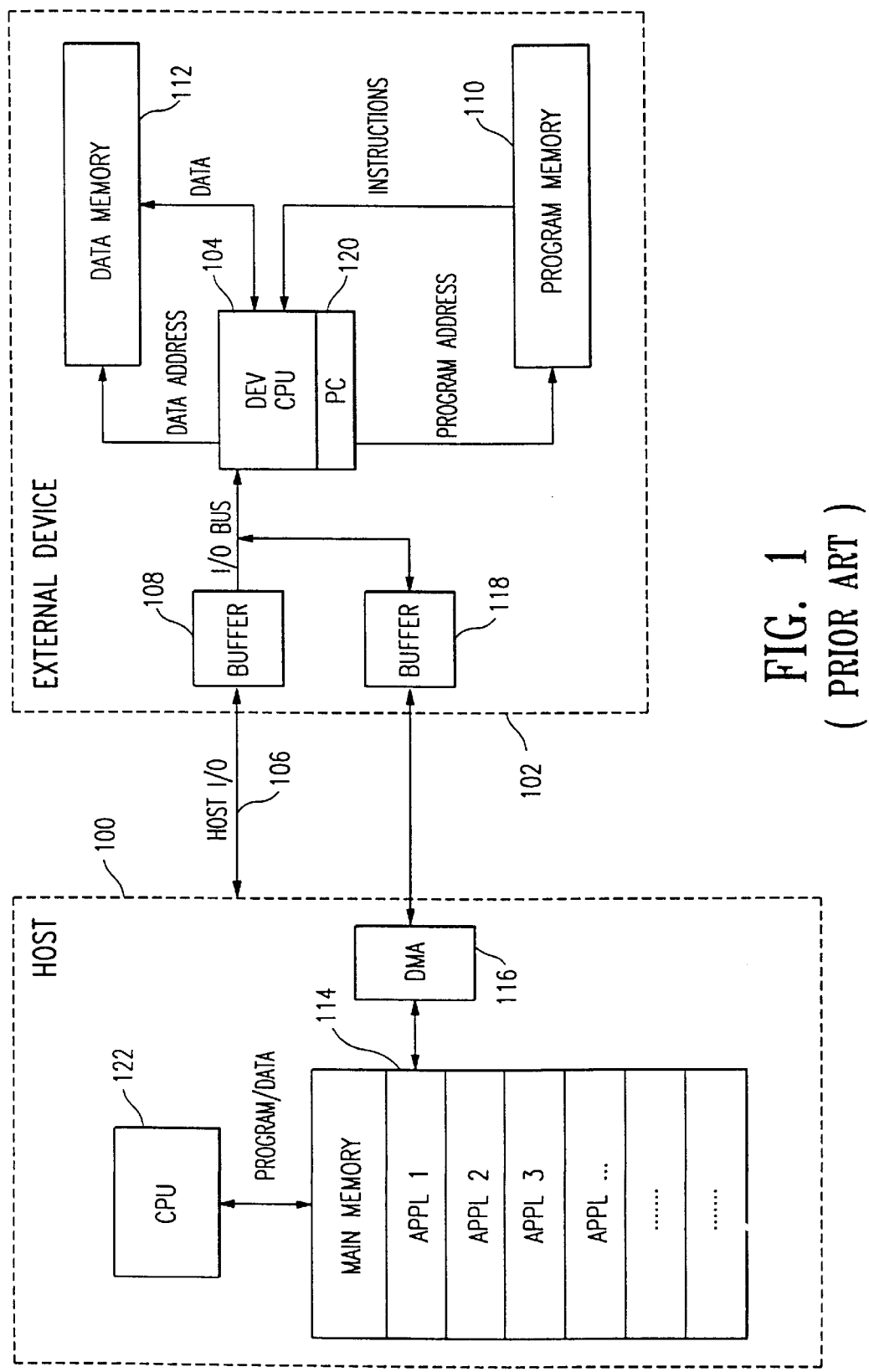
FIG. 1 is a block diagram of a system in accordance with one method for coupling an External Processing Device to a Host Computer.
Figure 2:
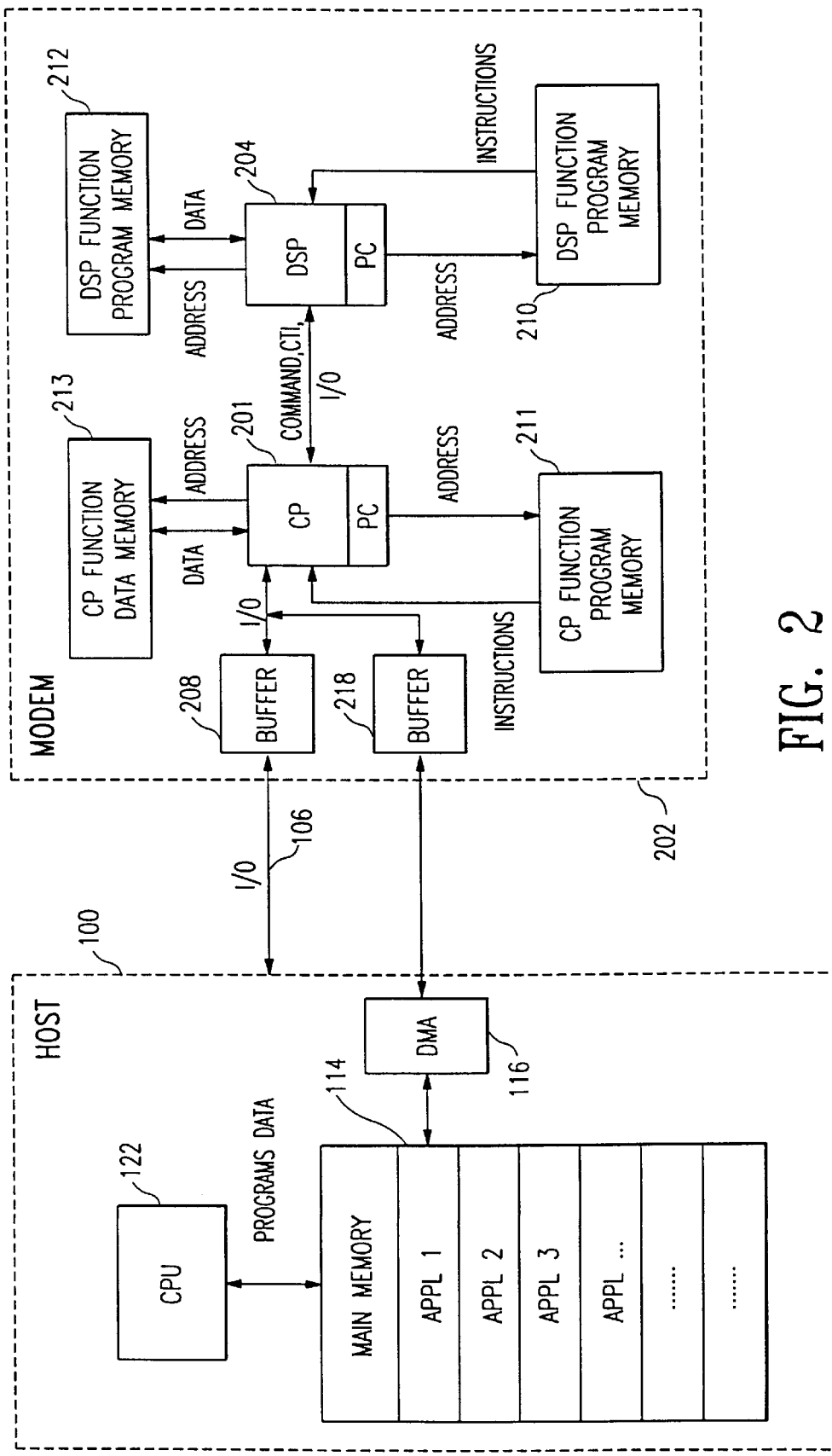
FIG. 2 is a block diagram of system in which a modem is coupled to a host computer.
Figure 3:
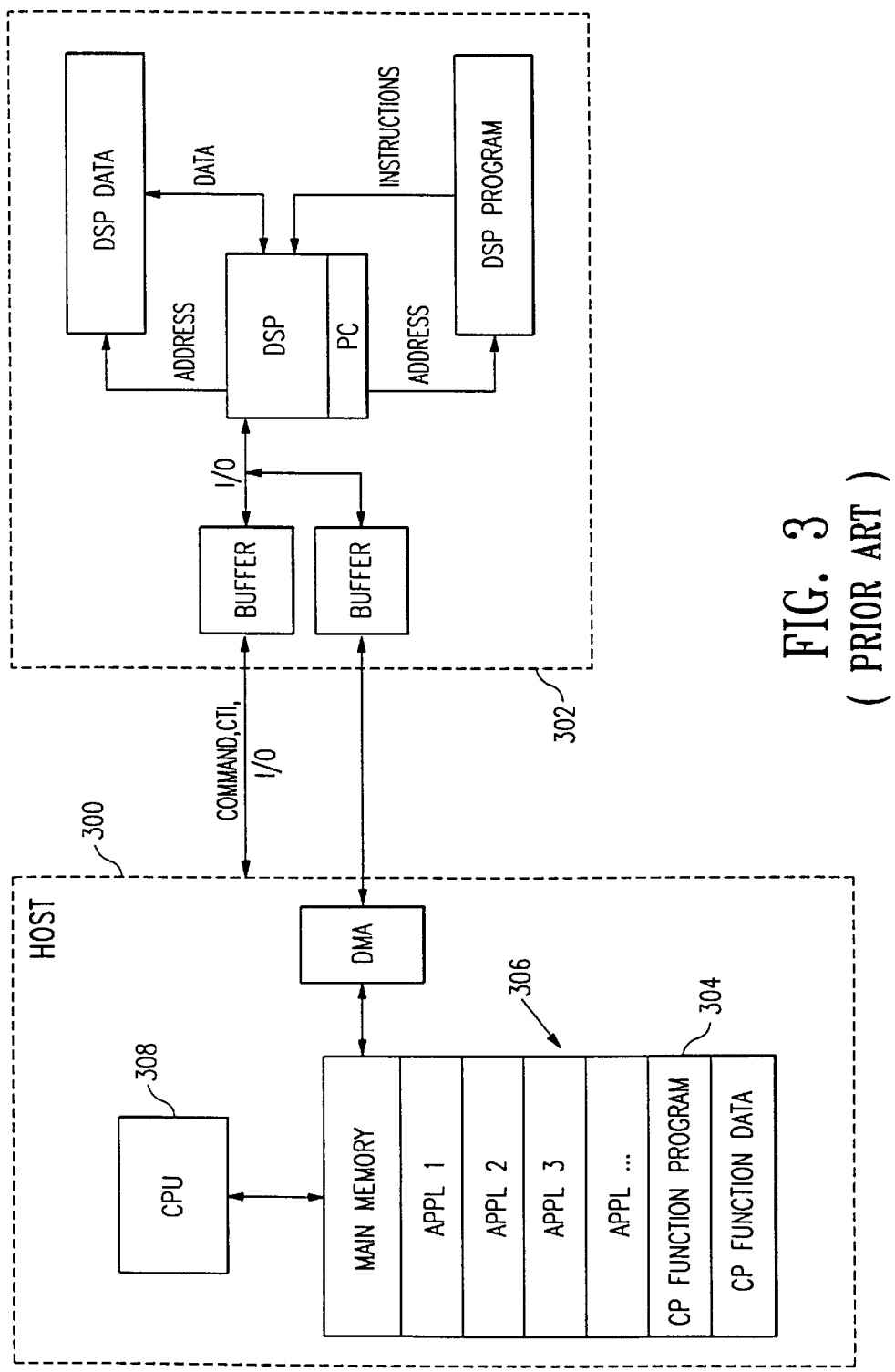
FIG. 3 is a block diagram of a modem and Host Computer configured as a host based modem system.
Figure 4:
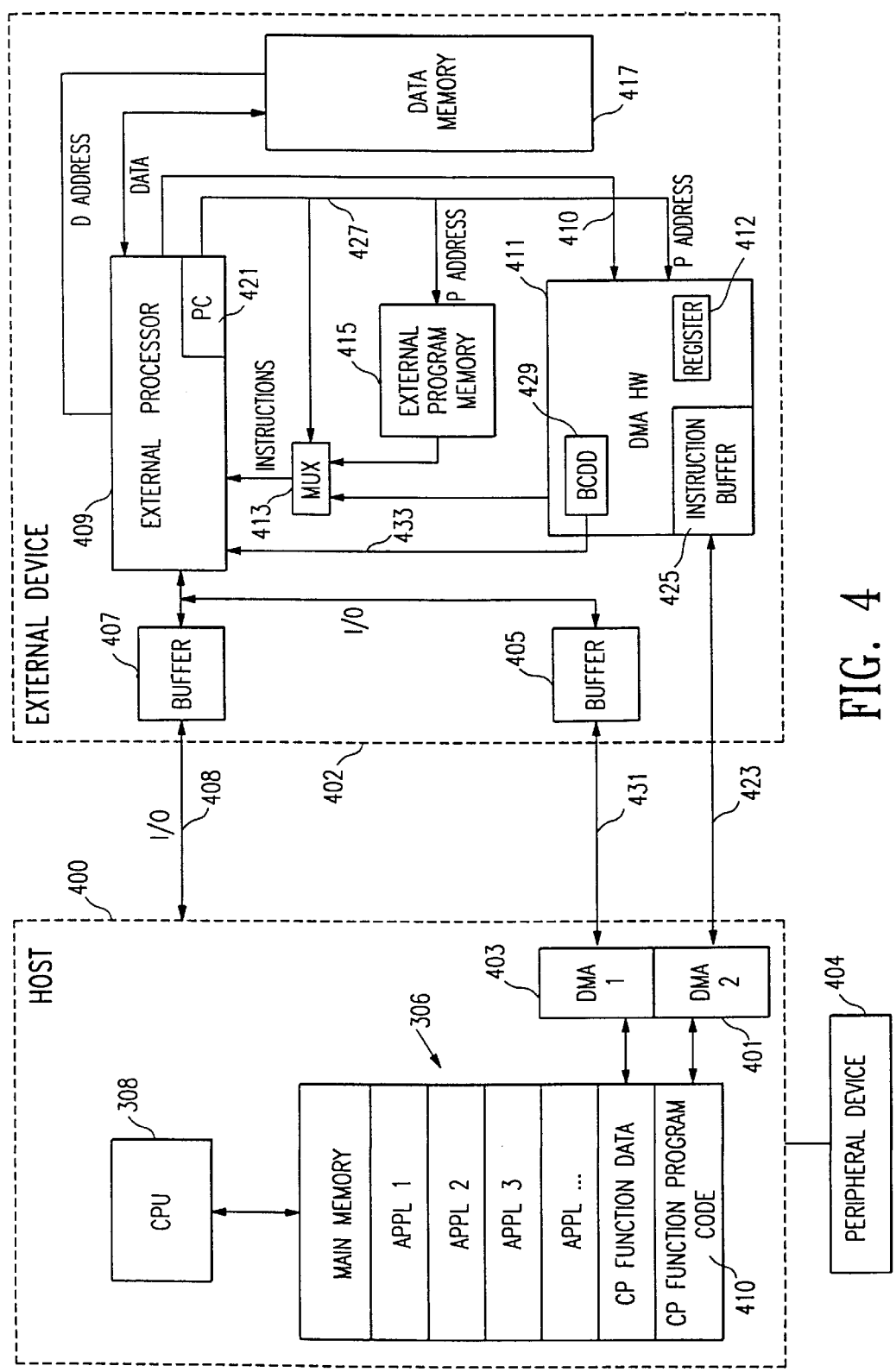
FIG. 4 is a block diagram of a system in which a Host Computer coupled to an external device in accordance with the present invention.

The present invention is a method and apparatus for storing within a Host Memory, program code for execution by an External Processor. For example, in many instances, a Host Computer has a relatively large memory in which programs to be executed by a host processor within the Host Computer are stored. In addition, data may be stored in the Host Memory. FIG. 4 is a block diagram of a system in which a Host Computer 400 includes a Host Processor (i.e., a CPU) 308, a Host Memory 306, a program direct memory access (DMA) device 401, and a data DMA device 403. In the embodiment of FIG. 4, an External Device 402 includes a Data Buffer 405, a Command Buffer 407, an External Processor 409, DMA hardware 411, an Instruction Multiplexer 413, an External Program Memory 415, and an External Data Memory 417.

The External Device 402 may be any device which requires program code in order to operate. In the embodiment shown in FIG. 4, the External Device 402 receives commands from the Host Computer 400 over an I/O channel 408. These commands are buffered within the Command Buffer 407. The commands received from the Host Processor are preferably high level commands which request the External Device to perform a function. For example, the External Device 402 may be modem, voice recognition system, compact disk player, video processor, audio processor, peripheral storage device, or any of a wide variety of other devices which require program code. Accordingly, in the case in which the External Device is a Modem, the Host Computer 400 may request the External Device to receive or transmit a data file over a telephone connection. Information required to perform the function may be stored within the External Data Memory 417. This information is read by the External Processor 409 as needed.

In one embodiment of the present invention, the External Device 402 is a particular type of device in which the functions that are performed by the External Processor 409 can be divided into time critical functions and functions that are not time critical. Time critical functions are those functions that should be performed within a predetermined and relatively short period of time after a determination that the task is required. For example, in a modem, it is preferred that the incoming signal be demodulated and decoded in real time (i.e., as the incoming signal is received). In order to demodulate and decode the incoming signal in real time, a number of arithmetic operations must be performed relatively rapidly. Typically, these arithmetic operations are performed by a specialized External Processor referred to as a digital signal processor (DSP).

In addition to the time critical functions, such as demodulating and decoding the incoming signal, there are a number of other functions that must be performed. However, these functions are not time critical. That is, it will not affect the operation of the External Device if these other functions are performed at a lower priority and after a delay. For example, communications functions between the host and the External Device may not need to be performed immediately upon request. Commands that are received from the Host Computer may be held for a period of time before the External Device 402 responds. In addition, functions such as user interface/command parser, autodialer, and auto-answerer are considered to be non-time critical. In one embodiment of the proposed invention, non-time critical programs such as these are executed by the DSP, because the DSP supports related functions. Alternatively, the DSP executes these functions because the programs are executives directing the sequenced execution of more time critical signal processing tasks.

In the embodiment of the present invention in which both time critical and non-time critical functions must be performed, non-time critical functions are referred to as control process ("CP") functions. It will be understood by those skilled in the art, that while CP functions are considered to be non-time critical, they should be performed within a relatively short time in order to prevent the delay from impacting the operation of the External Device. Time critical functions are referred to as "External Program" functions. In accordance with one embodiment of the present, both external program functions and CP functions are performed by the External Processor 409. Accordingly, the particular type of host processor to which the External Device is coupled is not relevant to the internal functioning of the External Device of the present invention. In addition, because the Host Processor communicates directly with the External Processor of the I/O channel 408, the External Device appears to the Host Computer as a real External Device. Appearing as a real External Device (as opposed to a virtual device) is advantageous, since some operating systems running in Host Computers (such as the well-known "DOS" operating system) do not support virtual devices (i.e., are incapable of communicating with virtual devices).

Furthermore, in order to reduce the amount of memory required within the External Device 402, only "External Program Code" (i.e., code that is executed by the External Processor 409 to perform External Program functions) is stored within the External Device 402. CP Function Program Code (i.e., the code that is executed by the External Processor 409 to perform CP functions), which typically requires more memory than an External Program Code, is stored in the Host Memory 306.

Details of Present Invention

In one embodiment of the present invention, shown in FIG. 4, the CP functions preferably include all non-time critical functions. For instance, in one embodiment of the present invention in which the External Device is a modem, the CP functions include user interface/command parser, autodialer, and auto answerer. In one embodiment of the present invention, the CP program is loaded into the Host Memory 306 via a conventional host peripheral device 404, such as floppy disk drive. Many host computers (such as laptop computers) include a peripheral device which is capable of accepting program information from a removable medium and transferring that information to the Host Memory 306. However, it will be understood by those of ordinary skill in the art that any means for loading the CP program into the Host Memory 306 may be used in accordance with the present invention, such as downloading from a serial or parallel port of the Host Computer.

Once the CP program has been stored in the Host Memory 306, the CP program may be accessed by the External Processor 409. In one embodiment of the present invention, when power is initially applied to the External Processor 409, a program counter 421 within the External Processor 409 is initialized to point to an initialization address at which a "Bootstrap Program" to be executed by the External Processor 409 is stored within the External Program Memory 415. Such "Bootstrapping" is generally well-known in the art. However, unlike prior art external devices, in accordance with the present invention, the Bootstrap Program causes the External Processor 409 to request a first block of CP program code from the Host Memory 306 via the DMA program channel 423 between the Host Computer and the External Device. The address is a predetermined address at which the CP program code resides within the Host Memory 306. In another embodiment of the present invention, the host processor writes a "bootstrapping address" to an input latch read by the External Processor 409 upon initialization. In this way, the bootstrap program is decoupled from the host-based code with entry points to the host-based code being written via an I-O channel from the host on power-up to fixed external processor memory-mapped locations. After power-up, the External Processor 409 requests the initial program block at the host-initialized locations. The addresses of subsequently requested blocks are based upon the internal logic of the host-based program.

Conventional DMA operations which request data to be read from a memory are well-known. However, in accordance with the present invention, the information that is being requested from the Host Memory 306 is program code rather than data. Therefore, inventive provisions are provided in the present invention for transferring program code. That is, since the External Processor 409 will be executing program code (e.g., CP Function Program Code) transferred from the Host Computer 400 to the DMA hardware 411, each portion of the CP Function Program Code must be present at the time the External Processor 409 requires that code. The DMA hardware 411 of the present invention includes an essentially conventional DMA bus master capable of providing bus ownership to the External Device (i.e., ensuring that the External Device has priority to use the DMA program channel 423). The inventive DMA hardware 411 of the present invention also includes an Instruction Buffer 425. The Instruction Buffer 425 receives the CP Function Program Code and preferably maintains each instruction of the code until the External Processor 409 has read that instruction. The Instruction Buffer 425 may be implemented in any manner which allows the instructions to be maintained for a sufficiently long period to permit the External Processor 409 to execute the instructions. The exact amount of time that the Instruction Buffer 425 must be able to maintain an instruction will depend upon implementation details, such as the speed of the External Processor 409, the speed of the DMA program channel 423, the priority with which the CP Function Program Code executes, and the number of delays that may be encountered in the execution of the CP Function Program Code. In the preferred embodiment, the Instruction Buffer 425 is implemented by a random access memory (RAM).

In one embodiment of the present invention, the provisions required to ensure timely transfer of the CP Function Program Code are provided in the CP Function Program Code itself. For example, in one embodiment of the present invention, the initialization code includes instructions which cause a command to be generated by the External Processor 409 to the DMA hardware 411. This command requests a first block of CP Function Program Code from the Host Memory 306 to be transferred to the Instruction Buffer 425. Once the first block of CP Function Program Code is transferred from the Host Memory 306, the CP Function Program Code itself will provide instructions to the External Processor 409 over signal line 410 which command the DMA hardware 411 to request a next block of CP Function Program Code from the Host Memory 306.

In one embodiment of the present invention, these "fetch" instructions are located at strategic locations within the block of CP Function Program Code to ensure that the next block of CP Function Program Code is transferred in time to be read by the External Processor 409 before the External Processor 409 requires any of the instructions within that block. This requires the programmers who create the CP Function Program Code to plan the execution path through the CP Function Program Code. In relatively small CP function programs, this may be the preferred embodiment. However, in larger CP function programs, the number of alternative flow paths may make it cumbersome and inefficient to have instructions embedded within the CP Function Program Code itself.

In an alternative embodiment of the present invention, interrupts are generated by a buffer content detection device (BCDD) 429 at regular timed intervals. The intervals are sufficiently short to ensure that the External Processor 409 can not execute all of the code transferred in one DMA transfer block. Alternatively, the particular instruction that is being executed and the number of additional instructions that are present in the Instruction Buffer 425 are determined. The time intervals are sufficiently short to ensure that the External Processor 409 can not execute all of the instructions left in the Instruction Buffer 425 before the next interrupt is generated. In one embodiment of the present invention, the BCDD 429 is sufficiently sophisticated to make adjustments to the time interval based upon the number of times the External Processor 409 reads an instruction from the Instruction Buffer 425. That is, by monitoring the address of the instructions being executed by the External Processor 409, the interrupt timer determines when to generate the next interrupt.

In another alternative embodiment, an initial block of CP Function Program Code is transferred from the Host Memory 306 to the Instruction Buffer 425 within the DMA hardware 411 in a similar manner to the embodiment described above. However, the BCDD 429 within the DMA hardware 411 causes an interrupt to the External Processor 409 on signal line 433 based upon the number of instructions that have been executed since the last interrupt was generated. In one embodiment of the present invention, the BCDD 429 is a counter that is incremented when a block of instructions are written to the Instruction Buffer 425. The BCDD is decremented when each instruction is executed (read from the Instruction Buffer 425 by the External Processor 409. Thus, the BCDD keeps track of the number of instructions or bytes of information remaining in the buffer at any particular time. The BCDD 429 interrupts the External Processor 409 each time the number of instructions within the Instruction Buffer 425 falls below a predetermined number. The particular number of instructions that must be present within the Instruction Buffer 425 will depend upon the speed of the DMA program channel 423 and the speed of the External Processor 409. In the preferred embodiment of the present invention, the number of instructions that must be present within the Instruction Buffer 425 should be sufficiently large to ensure that the External Processor 409 will not require the last instruction in the Instruction Buffer 425 before the next block of instructions have arrived.

In yet another embodiment of the present invention, the Instruction Buffer 425 is controlled as an instruction cache.

That is, the last used last instructions are held in the Instruction Buffer 425 until an instruction is requested that is not currently present in the Instruction Buffer 425. At that time, the DMA hardware 411 requests a DMA transfer of a block of CP Function Program Code which includes the requested instruction.

In each of the cases described above, upon receipt of an interrupt by the External Processor 409 from the DMA hardware 411 over signal line 433, the External Processor 409 executes an interrupt routine which determines the next block of addresses to be read from the Host Memory 306 in order to transfer the next block of CP Function Program Code into the Instruction Buffer 425. In one embodiment of the present invention, the start address for the transfer from the Host Memory 306 is taken from a register 412 within the DMA hardware 411 that holds the address of the last byte of the last block transferred. Alternatively, the start address of the next block to be transferred is derived from a value (i.e., an address) coupled to the DMA hardware 411 from the program counter 421 over a "Program Counter" signal line 427. The value of the program counter 421 is coupled to the DMA hardware 411 to indicate which instruction is to be executed next.

In accordance with one embodiment of the present invention, a determination is made as to whether each instruction requested by the External Processor 409 is a CP Function Program Code instruction or an External Program Code instruction. The determination is made based upon the value of the instruction address supplied by the program counter 421. If the address is within a first predetermined range, then the requested instruction is a CP Function Program Code instruction. If the address is not within the first predetermined range, then the instruction is an External Program Code instruction to be read from the External Program Memory 415. In one embodiment of the present invention, a second determination can be made to determine whether the program counter value falls within a second range of values to verify that the program counter value is a valid address. The Program Counter signal line 427 is also coupled to the External Program Memory 415. In accordance with one embodiment of the present invention. a similar determination is made by the External Program Memory 415. If the program counter value is within the second predetermined range, the External Program Memory 415 will provide the instruction to the External Processor 409.

In one embodiment of the present invention, the Instruction Multiplexer 413 selects whether the DMA hardware 411 or the External Program Memory 415 is to be coupled to the External Processor 409. In one embodiment of the present invention, the Instruction Multiplexer 413 is coupled to the program counter 421 over the Program Counter signal line 427. The Instruction Multiplexer 413 selects which device 411, 415 will provide the next instruction to the External Processor 409 based upon the value of the program counter 421.

In one embodiment of the present invention, at least some of the data that is related to the CP functions (i.e., "CP function" data) is stored in the Host Memory 306. The Data Buffer 405 provides a buffer for the CP function data read from the host buffer over a DMA data channel 431. The External Processor 409 requests CP function data by requesting a DMA data transfer operation to be performed by the data DMA device 403. The DMA data transfer operation is essentially a conventional DMA operation. That is, no special provisions are required for the data transfer, since the data transfer is not as time critical as the transfer of instructions. Furthermore, the External Device need not have the ability to own the bus for DMA data transfers. Accordingly, in the preferred embodiment of the present invention, the DMA data transfer request is preferably not made through a DMA device that resides within the External Device 402.

In most programs, instructions are not executed in sequential order. For example, branches and jumps typically occur which cause the sequence of code that is executed to be dependent upon data values or external events. Accordingly, it is likely that instructions may not be present in the Instruction Buffer 425 when required by the External Processor 409, despite efforts to predict which instruction will be required next. In accordance with one embodiment the present invention, when an instruction is required and is not present in the Instruction Buffer 425, the Instruction Buffer 425 returns a NOP (no operation code) to the External Processor 409 until the required instruction is transferred from the Host Memory 306. Accordingly, the External Processor 409 will idle until an interrupt occurs which cause the External Processor 409 to execute other code, or the instruction that is required become available in the Instruction Buffer 425.

Figure 5:
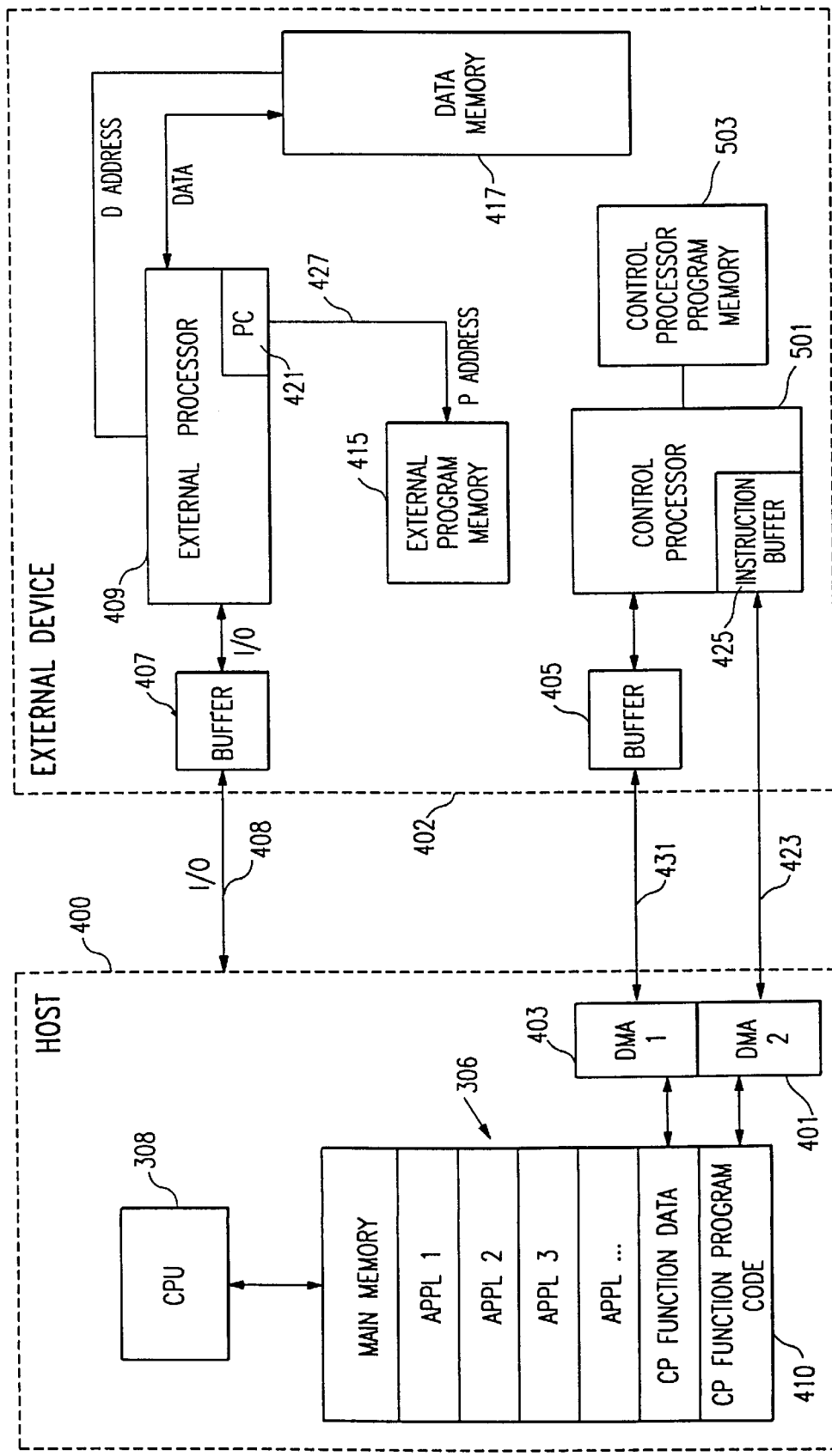
FIGS. 5 is a block diagram of an alternative embodiment of the present invention.

FIG. 5 is a block diagram of an alternative embodiment of the present invention. In the embodiment of FIG. 5, the External Device 402 includes a Control Processor 501. The functions performed by the DMA hardware 411 shown in FIG. 4 are preferably performed by the Control Processor 501 of FIG. 5. Alternatively, discrete DMA hardware is also included within the External Device 402. In the preferred embodiment of the invention shown in FIG. 5, the Control Processor 501 is responsible for controlling the DMA operation and executing the code that is retrieved from the Host Computer 400. An Instruction Buffer 425 is included in the Control Processor 501. Alternatively, a discrete Instruction Buffer 425 is provided which is not included within the Control Processor 501 and the Data Buffer 405 is included within the External Device 402. In one embodiment of the present invention, the Data Buffer 405 is included within the Control Processor 501.

In accordance with the embodiment of the invention shown in FIG. 5, the Control Processor 501 operates essentially in the same manner described above. That is, upon initialization, the Control Processor 501 reads an initialization program from a relatively small Control Processor Program Memory 503 within the External Device 402. The initialization program provides instructions to cause the Control Processor 501 to perform a DMA operation into the Host Memory 306. The DMA operation causes a block of code from the CP Function Program Code stored in the Host Memory 306 to be transferred into the Instruction Buffer 425. The Control Processor then begins executing the CP Function Program Code from the Instruction Buffer 425. Inclusion of a discrete Control Processor 501 off loads the External Processor 409 to allow the External Processor 409 to perform the time critical functions without the need to share processor resources with the CP functions.

Figure 6:
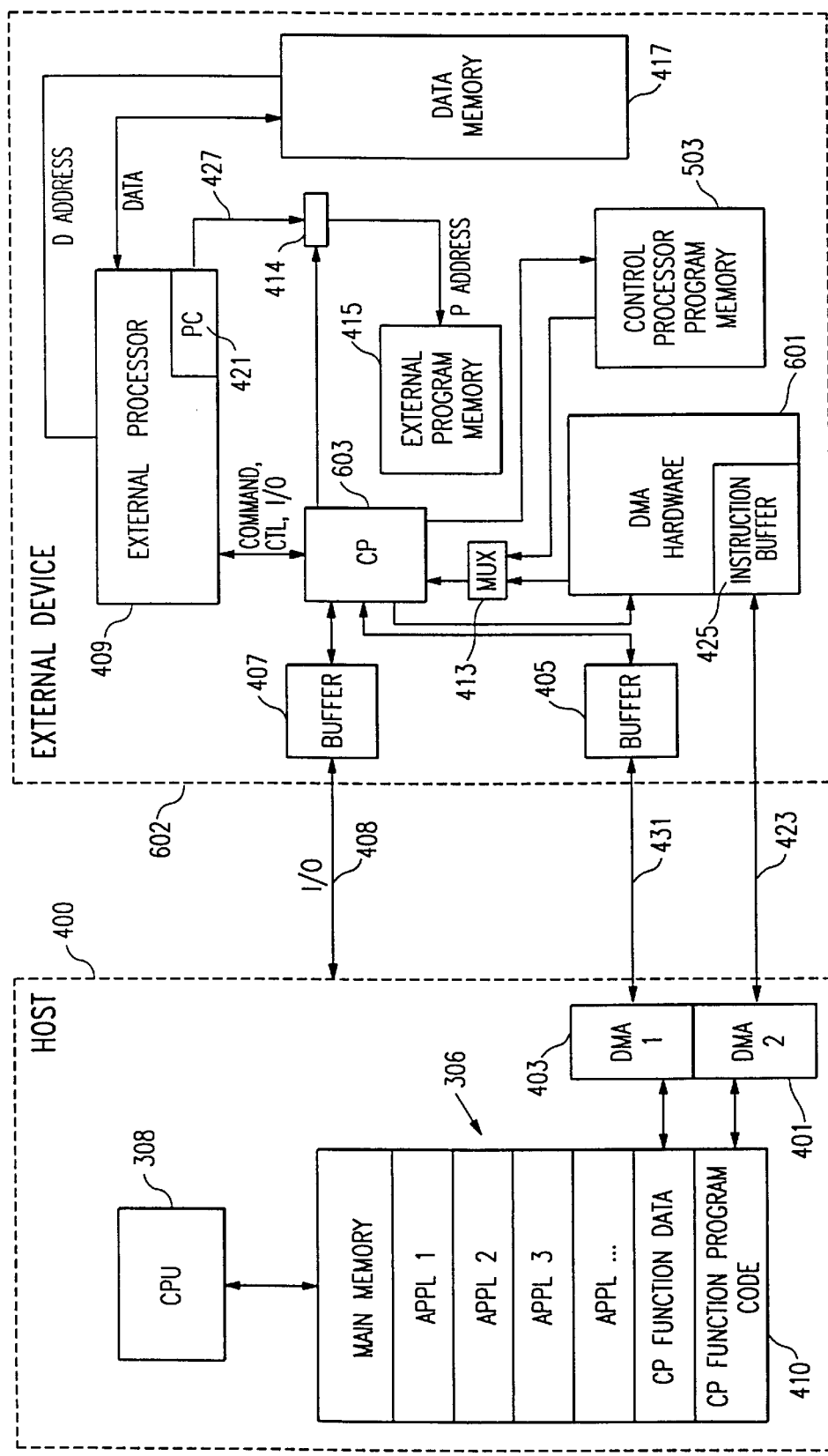
FIG. 6. is a block diagram of an embodiment of the present invention, in which the External Device includes a discrete Control Processor and DMA hardware.

FIG. 6 is a block diagram of an embodiment of the present invention, in which the External Device 602 includes a discrete Control Processor 603 and DMA hardware 601. The Control Processor 603 operates essentially the same as the External Processor 409 described above. However, the Control Processor 603 only executes CP Function Program Code instructions. The External Device 602 includes a Instruction Multiplexer 413 which selects between a Control Processor Program Memory 503 and the output from the DMA hardware 601. However, in the embodiment of FIG. 6, the Control Processor 603 only receives initialization instructions from the Control Processor Program Memory 503. In one embodiment of the present invention, the Control Processor Program Memory 503 is included within the External Program Memory 415. Accordingly, a multiplexer 414 is provided for coupling the value of the program counter 421 to the External Program Memory 415. In addition the multiplexer 414 couples the output from the External Program Memory 415 to the Control Processor 603. In one embodiment, the multiplexer 414 gives priority to the External Processor 409. By giving priority to the External Processor 409, the External Program Memory 415 can be shared without adversely affecting the speed of the External Processor 409 and the ability of the External Processor 409 to access instructions from the External Program Memory 415. Alternatively, since the Control Processor 603 only accesses the Control Process Program Memory 503 upon initialization, the Control Processor 603 is given priority over the External Processor 409.

Summary

A number of embodiments of the present invention have been described. Nevertheless, it will be understood that various modifications may be made without departing from the spirit and scope of the invention. For example, the present invention is described using a DMA operation which is well-known in the art in order to transfer program code from the Host Memory to the External Device. However, any means for reading program instructions from the Host Memory and transferring the instructions to the External Device without the intervention of the Host Processor would be within the scope of the presently disclosed invention. Furthermore, any particular type of processor, state machine, which operates on instructions provided in the form of a program, or other type of programmable hardware may be used to implement the Host Processor, the External Processor, the Control Processor, or any processors which are included within the DMA hardware. Furthermore, any the particular functions may be included within the CP Function Program Code, External Program Code. In addition, the CP Function Program Code and External Program Code may be implemented in any programming language. Accordingly, it is to be understood that the invention is not to be limited by the specific illustrated embodiment, but only by the scope of the appended claims.

I claim:

1. An external device for use with a host computer having a host memory for storing program and data for use by the host computer, including:

(a) a means for requesting a direct memory access, coupled to the host memory, for initiating a direct memory access operation in order to access information, including program instructions, stored within the host memory;

(b) a secondary computer, coupled to the direct memory access controller, for transmitting and receiving information from the direct memory access controller, including program instructions to be executed by the secondary computer;

further including:

(c) a special function program memory, coupled to the secondary computer, for storing special function programs; and (d) a multiplexer, coupled to the secondary computer, the special function program memory, and the direct access memory device, for selectively coupling instructions to the secondary computer from either the direct memory access device or the local special function program memory, further including an instruction buffer, coupled to the host memory and to the direct memory access device, for buffering instructions received from the host memory, and making the received instructions available to the secondary computer.

2. A modem, for communicating between a first and second end station, the first end station having a general purpose host computer having a host memory, said modem including:

a direct memory access controller for accessing information stored within the host memory;

a digital signal processor coupled to the direct memory access controller effective for causing the direct memory access controller to initiate a direct memory access operation in response to requirements derived internally to the digital signal processor in order to make program instructions available to the digital signal processor and for receiving from the direct memory access controller program instructions read by the direct memory access controller from the host memory to be executed by the digital signal processor;

wherein the program instructions control the operation of the digital signal processor to demodulate the information to be communicated between the first and second end stations.

\* \* \* \* \*